United States Patent
Wolff

(10) Patent No.: US 6,899,123 B1
(45) Date of Patent: May 31, 2005

(54) VALVE ARRANGEMENT, ESPECIALLY FOR A SLIP-CONTROLLED HYDRAULIC VEHICLE BRAKING SYSTEM

(75) Inventor: Guenter Wolff, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 10/129,303

(22) PCT Filed: Oct. 28, 2000

(86) PCT No.: PCT/DE00/03815

§ 371 (c)(1),
(2), (4) Date: Jan. 31, 2003

(87) PCT Pub. No.: WO01/32486

PCT Pub. Date: May 10, 2001

(30) Foreign Application Priority Data

Nov. 3, 1999 (DE) .......................... 199 52 855

(51) Int. Cl.$^7$ .................. F16K 31/06; F16K 43/00; F16K 51/00; F16L 55/18
(52) U.S. Cl. .................. 137/315.03; 137/15.18; 251/129.15
(58) Field of Search .................. 251/129.01, 129.15; 137/15.17, 15.18, 315.03

(56) References Cited

U.S. PATENT DOCUMENTS

| | | | |
|---|---|---|---|
| 5,895,026 A * | 4/1999 | Linkner et al. | 251/129.15 |
| 6,439,265 B1 * | 8/2002 | Gruschwitz et al. | 137/601.14 |
| 6,450,590 B1 * | 9/2002 | Leventhal | 303/119.2 |

FOREIGN PATENT DOCUMENTS

| | | | | |
|---|---|---|---|---|
| DE | WO 95/14594 A1 | * | 6/1995 | ............ B60T/8/26 |
| DE | 197 09 741 A | | 9/1998 | |
| EP | 0 758 719 A | | 2/1997 | |
| WO | WO 94 01708 A | | 1/1994 | |
| WO | WO 99 44872 A | | 9/1999 | |

OTHER PUBLICATIONS

Patent Abstracts of Japan, vol. 018, No. 297 (M–1617) Jun. 7, 1994; with JP 06 058451 A (Hitachi Ltd), Mar. 1, 1994; Zusammenfassung; Abbildungen.
Patent Abstracts of Japan, vol. 003, No. 126 (M–077); Oct. 20, 1979; with JP 54 103971 A (Aisin Seiki Co Ltd), Aug. 15, 1979; Zusammenfassung; Abbildung.

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A valve assembly, in particular for a hydraulic vehicle brake system with traction control, having at least one, preferably electromagnetically actuatable valve, which receives valve components in a valve housing and is retained by fastening means by nonpositive and/or positive engagement in a receiving bore of a valve block. The valve block, at least in the region of the receiving bore, comprises thermoplastic, and the fastening means have at least one retracted region on the radially outer circumference of the valve housing or of a valve holder that retains the valve housing in the receiving bore, into which region plastic rendered molten by heating and ensuing insertion of the valve and/or of the valve holder into the receiving bore can flow, and after cooling of the thermally deformed plastic a positive-engagement connection can develop between the valve housing and the receiving bore or the valve holder and the receiving bore.

12 Claims, 4 Drawing Sheets

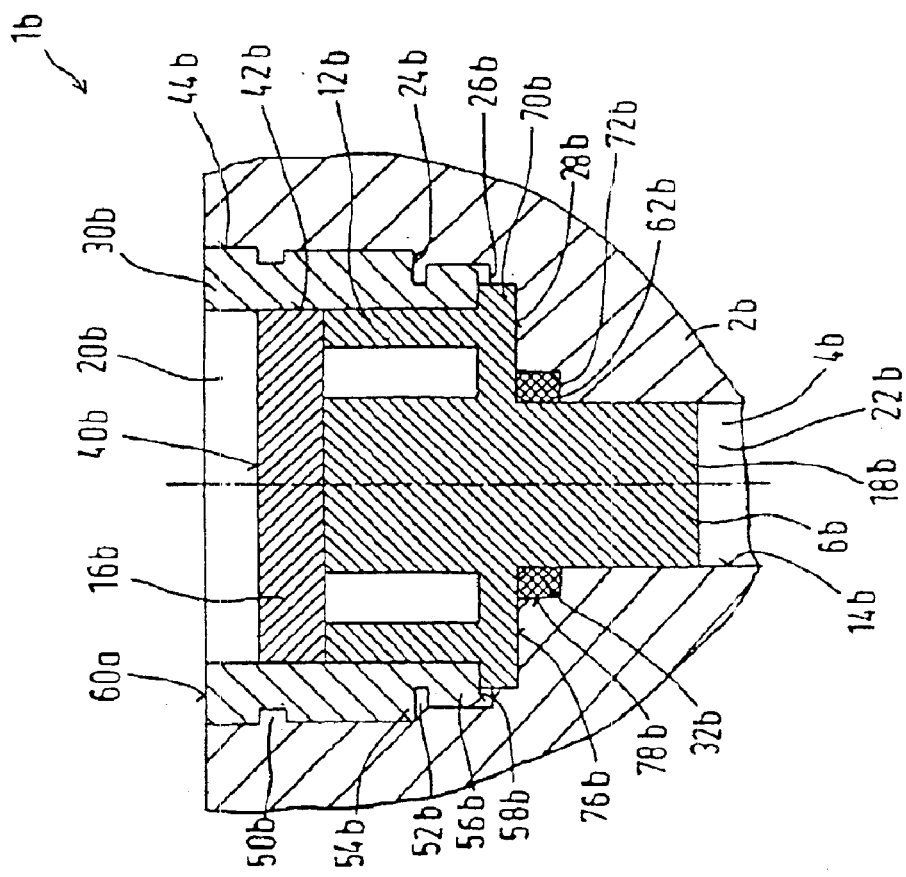
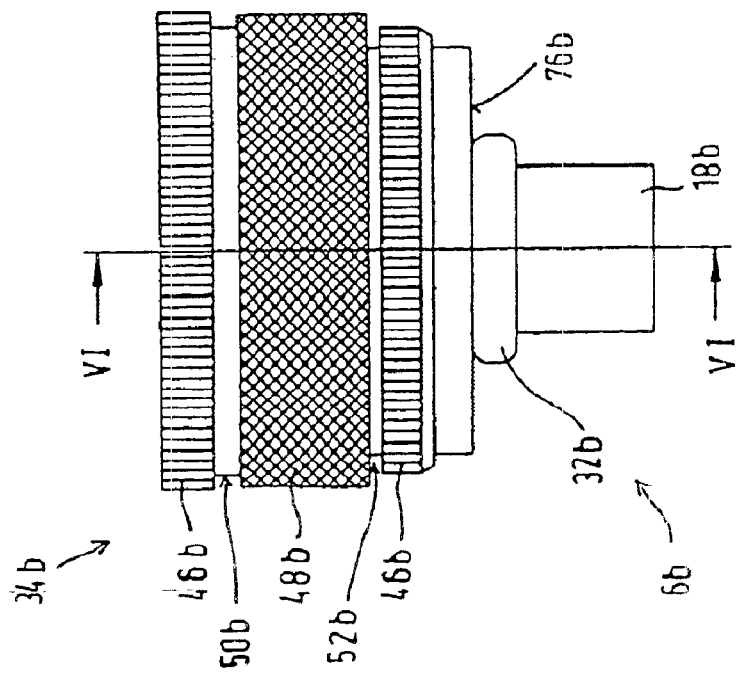
FIG.5
FIG.5

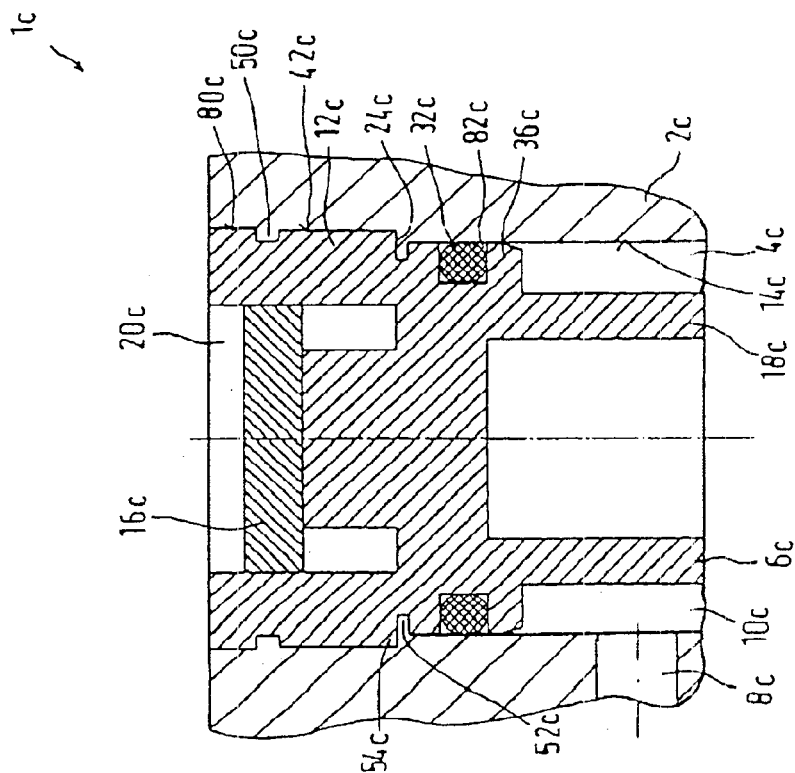
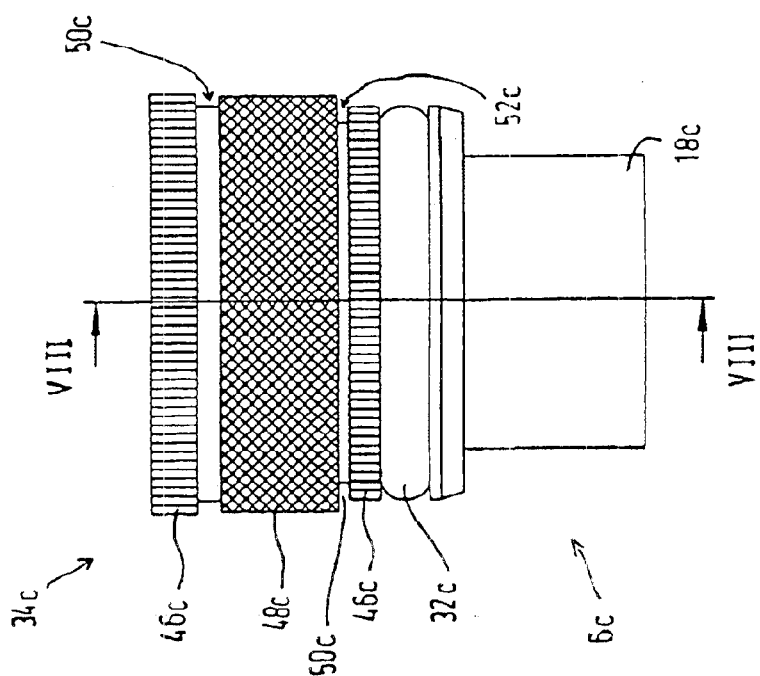
FIG.8
FIG.7

VALVE ARRANGEMENT, ESPECIALLY FOR A SLIP-CONTROLLED HYDRAULIC VEHICLE BRAKING SYSTEM

CROSS-REFERENCE TO RELATED APPLICATIONS

This application is a 35 USC 371 application of PCT/DE 00/03815 filed on Oct. 28, 2000.

BACKGROUND OF THE INVENTION

1. Field of the Invention

The invention is based on a method for producing a valve assembly, in particular for a hydraulic vehicle brake system with traction control and to a valve assembly produced by the method.

2. Description of the Prior Art

From International Patent Disclosure WO 99/44872, an electromagnet valve is known, having a valve housing that receives valve components and is secured in a stepped bore of a thermoplastic valve block. The diameter of the valve housing is reduced in the joining direction by a shoulder, which is adjoined by a recess embodied as an annular groove. Moreover, the material comprising the valve block has a lesser material hardness than the material of the valve housing. During the insertion motion of the electromagnet valve into the stepped bore of the valve block, the shoulder of the valve housing takes on the function of a calking die, which plastically displaces the softer material of the valve block positively into the annular groove of the valve-housing. This creates a positive-engagement connection between the valve housing of the electromagnet valve and the valve block.

A brake force regulator of twin-design is also known from International Patent Disclosure WO 95/14594; it has two regulating valves, whose housings are embedded in a plastic valve block in the production of the valve block. A magnet valve is also secured to the valve block by calking.

SUMMARY OF THE INVENTION

The method of the invention has the advantage of the prior art that the in the assembly of the valves, no impact loads that could damage the valve components or the valve block occur in the receiving bores. Because of the melting of the valve block, made of thermoplastic, in the region of the inner wall of the receiving bore as a result of the previously heated and then inserted valve, a readily flowing viscous melt is created, which does not penetrate into even tiny indentations in the valve housing or the valve holder. Since moreover the strength properties of the melted and re-hardened plastic are not significantly different from those of untreated plastic, a reliable positive-engagement connection is assured. This makes an especially gentle installation of the valves possible.

A valve assembly produced according to the method of the invention provides that the retracted region has knurled features and/or cross-hatched knurled features, embodied on the outer circumference of the valve housing, and additionally has two annular grooves, spaced apart from one another in the axial direction, of which one annular groove is disposed in the region of a radially outer shoulder that reduces the outer diameter of the valve housing, as viewed in the joining direction, and that is braced against a first radially inner shoulder of the receiving bore, and that a sealing ring, preferably embodied as an O-ring, is fastened in an annular chamber that is defined in the radial direction by the valve housing and the inner wall of the receiving bore of the valve block and in the axial direction by the inner wall of the receiving bore of the valve block and by the valve holder or the valve housing, or only by the valve housing. In that case it suffices to bring the outer region of the valve holder or valve housing to the melting temperature of the plastic, while the valve components located farther inside are exposed to a lesser temperature and the valve can therefore be installed still more gently. Furthermore, the encircling knurled features make a relatively large-area attachment of the valve holder or valve housing in the receiving bore possible. Moreover, by means of the fastened sealing ring, a pressure- and fluid-tight sealing off of the valve in the valve block is attained in a simple way.

By the provisions recited in the dependent claims, advantageous refinements of and improvements to the invention defined by claim 2 are possible.

DRAWINGS

Exemplary embodiments of the invention are shown in the drawings and explained in further detail in the ensuing description.

BRIEF DESCRIPTION OF THE DRAWINGS

Exemplary embodiments of the invention are described in further detail herein below, with reference to the drawings, in which.

DESCRIPTION OF THE PREFERRED EMBODIMENTS

Figure 2:
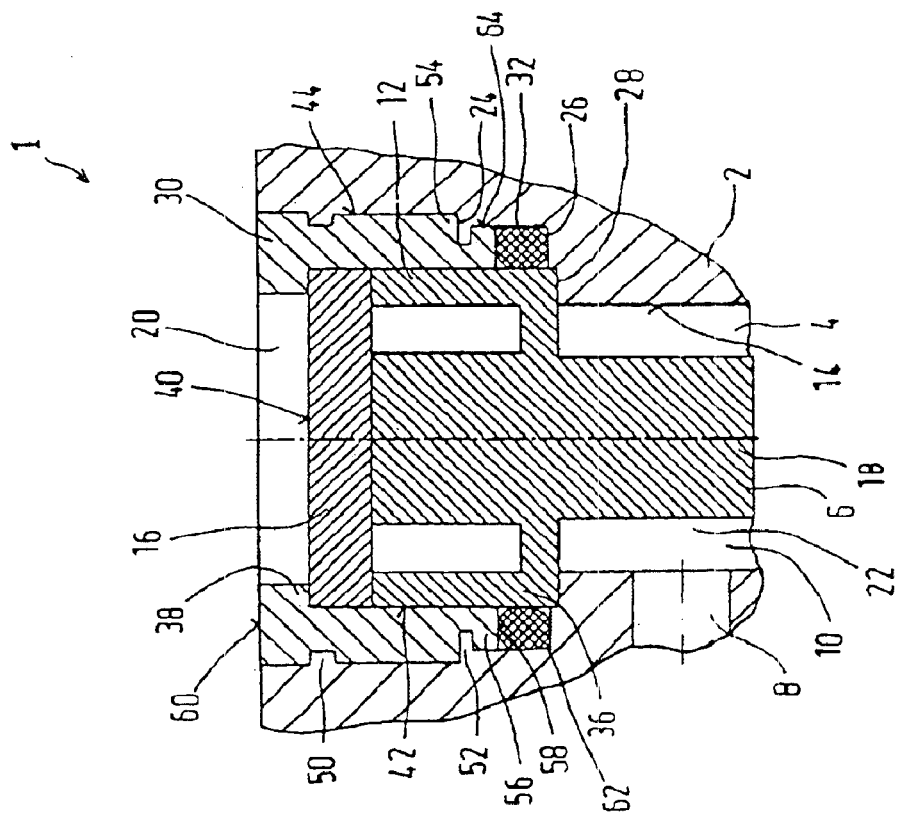
FIG. 2 is a sectional view taken along the line II—II in FIG. 1.
Figure 1:
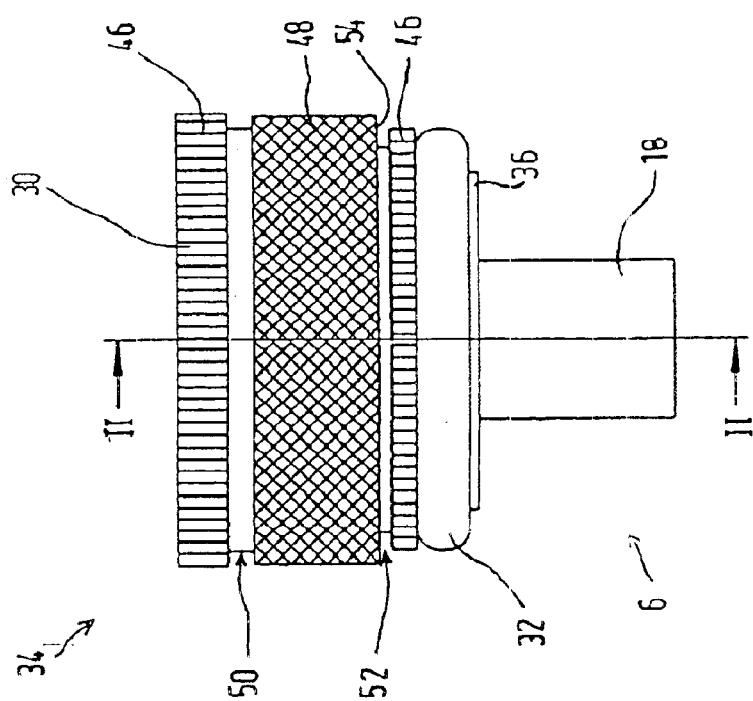
FIG. 1 shows a side view of a valve assembly of the invention in a preferred embodiment.

In the exemplary embodiment of FIGS. 1 and 2, the valve assembly 1 of the invention is intended for instance for a hydraulic vehicle brake system with traction control and includes a valve block 2 which essentially entirely comprises thermoplastic and in which receiving bores 4 are embodied for receiving preferably electromagnetically actuatable valves, of which the valve shown in FIG. 1 is for instance a 2/2-way outlet valve 6 that in its currentless basic position blocks the return flow of brake fluid from a wheel cylinder to a return pump. The communication with the return pump is established by an outlet conduit 8 extending transversely in the valve block 2 and discharging into an annular conduit 10 between a valve housing 12 that receives valve components and an inner wall 14 of the receiving bore 4. The valve housing 12 preferably has a larger-diameter valve housing head 16, in which a magnet coil and a pole core, for instance, are accommodated, and a smaller-diameter valve housing foot 18, which surrounds a valve seat, for instance. Correspondingly, the diameter of an upper portion 20 of the receiving bore 4 that receives the valve housing head 16 is larger than a lower portion 22.

As can be seen from FIG. 2, the upper portion 20 of the receiving bore 4 is also stepped multiple times, and because of a first radially inner shoulder 24 and a second radially inner shoulder 26 adjoining it in the joining direction of the valve 6 and a third radially inner shoulder 28, the diameter decreases in stages. The shoulders 24, 26, 28 serve to support the valve 6, a valve holder 30, and a sealing ring, embodied as an O-ring 32, in the receiving bore 4; these components together make up a preassembled unit 34, shown in FIG. 2.

The bushlike valve holder 30 is slipped onto the valve housing head 16 and surrounds it axially almost completely; only a lower portion 36 of the valve housing head 6 that is only insignificantly longer than the diameter of the cross section of the O-ring 32 protrudes. The valve holder 30, on its head end, has a radially inner shoulder 38, which fits over the edge of the end face 40 on the head end of the valve housing 12 in the preassembled state. The radially outer circumferential face 42 of the valve housing head 16 is cylindrically smooth and can therefore be produced simply and economically.

As best seen from FIG. 1, knurled features 46 and cross-hatched knurled features 48 are embodied on the outer circumference 44 of the valve holder 30. In addition, two annular grooves 50, 52 spaced apart from one another in the axial direction are provided, of which one annular groove 52 is disposed in the region of a radially outer shoulder 54 that reduces the outer diameter of the valve holder 30 in the joining direction. The O-ring 32 is radially stretched and is slipped, in the preassembled state, onto the lower portion 36 of the valve housing head 16 protruding from the foot end 56 of the valve holder 30 until it rests on the foot-end end face 58 of the valve holder 30.

For installation in the receiving bore 4, the above-described preassembled unit 34 is heated and forced or inserted into the receiving bore 4 until the radially outer shoulder 54 of the valve holder 30 strikes the first radially inner shoulder 24 of the receiving bore 4, and the lower portion 36 of the valve housing head 16, protruding from the valve holder 30, strikes the third radially inner shoulder 28 of the receiving bore 4. A disklike upper end face 60 of the valve holder 30 is flush with the edge of the receiving bore 4.

Since the inside diameter of the upper portion 20, oriented toward the valve holder 30, of the receiving bore 4 is only insignificantly greater than the outside diameter of the valve holder 30, the outer circumference 44 of the valve holder 30 rests in heat-transferring fashion on the inner wall 14 of the receiving bore As a result, the thermoplastic of the inner wall 14 of the receiving bore 4 is melted and can flow into the retracted regions formed by the two annular grooves 50 the knurled features 46, and the cross-hatched knurled features 48. After the accordingly thermally deformed plastic has cooled down, a positive-engagement connection exists between the valve holder 30 and the receiving bore 4.

As a result of the positive engagement, the valve housing head 16 is braced between the radially inner shoulder 38 of the valve holder 30 and the third radially inner shoulder 28 of the receiving bore 4. Moreover, the O-ring 32 is thus clamped in an annular chamber 62, which is defined in the axial direction by the bottom end face 58 of the valve holder 30 and the second radially inner shoulder 26 of the receiving bore 4 and in the radial direction by the lower portion 36, protruding from the valve holder 30, of the valve housing head 16 and the part 64 of the inner wall 14 of the receiving bore 4 that adjoins the first radially inner shoulder 24 in the joining direction. The O-ring 32 serves to seal off the annular conduit 10, communicating with the outlet conduit 8 in the valve block, in pressure- and fluid-tight fashion toward the head of the valve 6.

Since the valve housing head 16 is preferably essentially the same length as the valve holder 30, the length of the lower portion 36, protruding from the valve holder 30, of the valve housing head 16 is equivalent to that of the radially inner shoulder 38 of the valve holder. Then the O-ring 32 can utilize the annular chamber 62, which is created by the axial offset of the valve housing 12 as a result of the radially inner shoulder 38 on the valve holder 30, so that an axially compact structure is obtained, and the upper portion 20 of the receiving bore 4, which receives the valve housing head 16, can be relatively short.

Figure 4:
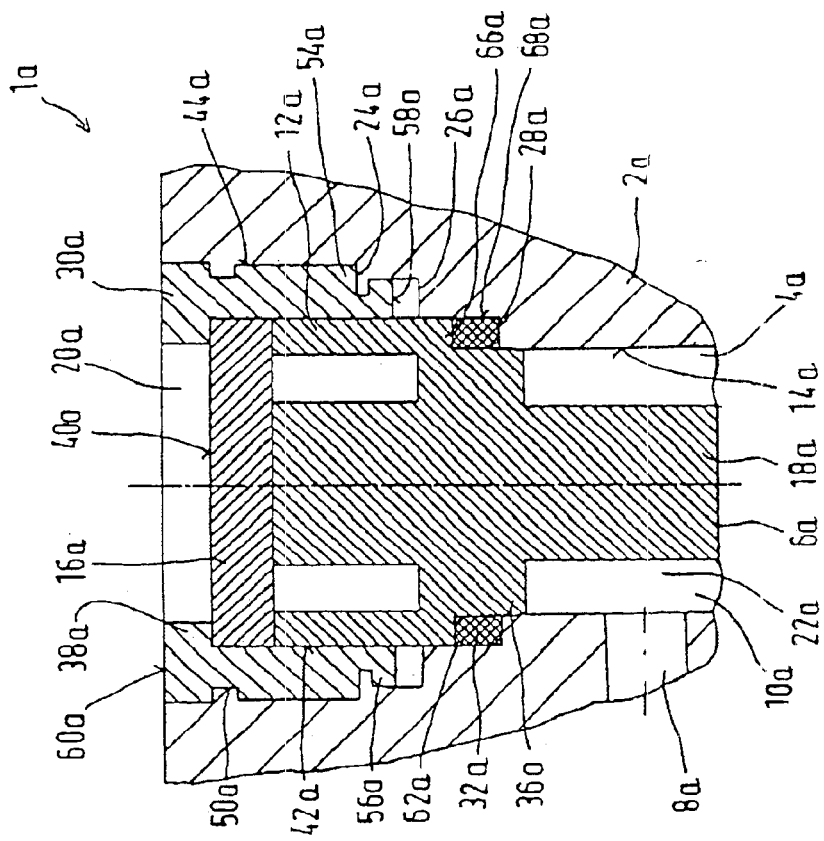
FIGS. 3 and 4; 5 and 6; and 7 and 8, respectively, show further embodiments in corresponding views.
Figure 3:
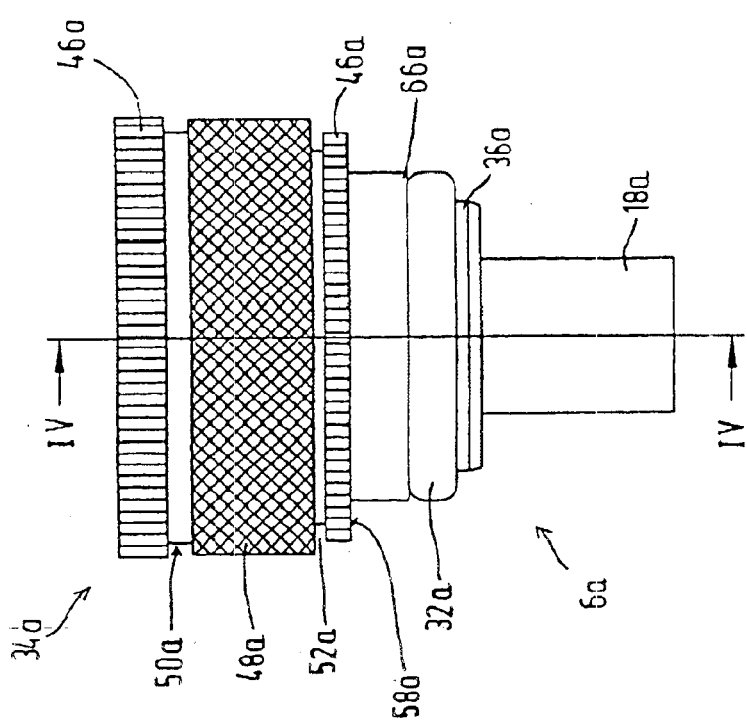

In a second embodiment, shown in FIGS. 3 and 4, the O-ring 32a is fastened in an annular chamber 62a, which is defined in the axial direction by an outer shoulder 66a, embodied on the lower portion 36a of the valve housing head 16a that protrudes from the valve holder 30a, and by the third radially inner shoulder 28a of the receiving bore 4a. In the radial direction, this annular chamber 62a is defined on the one hand by the valve housing head 16a, whose diameter at this point is reduced by the shoulder 66a, which corresponds in its depth to the cross section of the O-ring 32a, and on the other hand by the part 68a of the inner wall 14a of the receiving bore 4a, which part adjoins the second radially inner shoulder 26a in the joining direction and at this point has essentially the same inside diameter as the valve holder 30a. As a result, the position of the O-ring 32a is shifted some distance farther inward radially. As a consequence, the total axial area on which the liquid pressure prevailing in the annular conduit 10a is exerted, is reduced by the area of the foot-end end face 58a of the valve holder 30a, so that the total pressure force acting on the valve holder 30a in the axial direction counter to the positive-engagement anchoring is reduced.

In a distinction from the first and second embodiments, in a third embodiment shown in FIGS. 5 and 6 the valve holder 30b has no radially inner shoulder; instead, it has a continuously smooth inner bore, making it simple and economical to produce. In addition, the valve housing 12b, on its outer circumference, has a flange ring 70b, which is fastened between the bottom end face 58b of the valve holder 30b and the third-radially inner shoulder 28b of the receiving bore 4b. Finally, the diameter of the receiving bore 4b is reduced further by means of a fourth radially inner shoulder 72b that adjoins the third radially inner shoulder 28b in the joining direction. The O-ring 32b is received in an annular chamber 62b, which is defined in the axial direction by a lower flange face 76b and by the fourth radially inner shoulder 72b of the receiving bore 4b. In the radial direction, this annular chamber 62b is defined by the reduced-diameter valve housing foot 18b and by the part 78b of the inner wall 14b of the receiving bore 4b that adjoins the third radially inner shoulder 28b in the joining direction. As a result, the location of the O-ring 32b is shifted still further inward radially by some distance, and therefore the total pressure force exerted on the valve holder 30b in the axial direction is reduced further.

Instead of providing a valve holder, the knurled features 46c, 48c and the two annular grooves 50c can be embodied directly on the outer circumference 80c of the valve housing 12c, as is shown for the fourth embodiment in FIGS. 7 and 8. The outer contour of the valve housing head 16c is then like that of the valve holder of the embodiments described above. In this case, the O-ring 32c is received in a further annular groove 82c, which on the outer circumference 80c of the valve housing head 16c is adjacent in the joining direction to the two annular grooves 50c that provide the positive engagement. Since a valve holder that surrounds the valve housing 12c is dispensed with here, the diameter of the valve housing head 16c can be selected as correspondingly small, which has a favorable effect in terms of the space conditions in the valve block 2c.

The foregoing relates to preferred exemplary embodiments of the invention, it being understood that other variants and embodiments thereof are possible within the spirit and scope of the invention, the latter being defined by the appended claims.

I claim:

1. A method for producing a valve assembly (1) for a hydraulic vehicle brake system with traction control, the system having at least one electromagnetically actuatable valve (6; 6a; 6b; 6c), which receives valve components in a valve housing (12; 12a; 12b; 12c) and is retained by nonpositive and/or positive engagement by fastening means in a receiving bore (4; 4a; 4b; 4c) of a valve block (2; 2a; 2b; 2c) that at least in the region of this receiving bore (4; 4a; 4b; 4c) comprises thermoplastic, and the fastening means have at least one retracted, plastic-filled region (46, 48, 50; 46a, 48a, 50a; 46b, 48b, 50b; 46c, 48c, 50c), on the radially outer circumference (80c) of the valve housing (12c) or of a valve holder (30; 30a; 30b) retaining the valve housing (12; 12a; 12b) in the receiving bore (4; 4a; 4b), the method comprising heating the valve (6; 6a; 6b; 6c) or the valve holder (30; 30a; 30b) before its insertion into the valve block (2; 2a; 2b; 2c);

inserting the heated valve (6; 6a; 6b; 6c) or valve holder (30; 30a; 30b) into the receiving bore (4; 4a; 4b; 4c);

permitting plastic of the valve block (2; 2a; 2b; 2c) heated and melted by the heated valve (6; 6a; 6b; 6c) or the heated valve holder (30; 30a; 30b) to flow into the at least one retracted region (46, 48, 50; 46a, 48a, 50a; 46b, 48b, 50b; 46c, 48c, 50c) of the valve housing (12) or of the valve holder (30; 30a; 30b); and permitting cooling and setting of the thermally deformed plastic to thereby attain a positive-engagement connection embodied between the valve block (2; 2a; 2b; 2c) and the valve housing (12c) or the valve holder (30; 30a; 30b).

2. A valve assembly (1), produced by the method of claim 1, for a hydraulic vehicle brake system with traction control, the system having at least one electromagnetically actuatable valve (6; 6a; 6b; 6c), which receives valve components in a valve housing (12; 12a; 12b; 12c) and is retained by nonpositive and/or positive engagement by fastening means in a receiving bore (4; 4a; 4b; 4c) of a valve block (2; 2a; 2b; 2c) that at least in the region of this receiving bore (4; 4a; 4b; 4c) comprises thermoplastic, and the fastening means having at least one retracted, plastic-filled region (46, 48, 50; 46a, 48a, 50a; 46b, 48b, 50b; 46c, 48c, 50c), on the radially outer circumference (80c) of the valve housing (12c) or of a valve holder (30; 30a; 30b) retaining the valve housing (12; 12a; 12b) in the receiving bore (4; 4a; 4b), the valve assembly further comprising, knurled features (46; 46a; 46b) and/or cross-hatched knurled features (48; 48a; 48b), embodied on the outer circumference (44; 44a; 44b) in the retracted region of the valve holder (30; 30a; 30b), and has two annular grooves (50; 50a; 50b), spaced apart from one another in the axial direction, of which one annular groove (52; 52a; 52b) is disposed in the region of a radially outer shoulder (54; 54a; 54b) that reduces the outer diameter of the valve holder (30; 30a; 30b), as viewed in the joining direction, and that is braced against a first radially inner shoulder (24; 24a; 24b) of the receiving bore (4; 4a; 4b); and a sealing ring, preferably embodied as an O-ring (32; 32a; 32b; 32c) fastened in an annular chamber (62; 62a; 62b; 62c), which chamber is defined in the radial direction by the valve housing (12; 12a; 12b; 12c) and the inner wall (14; 14a; 14b; 14c) of the receiving bore (4; 4a; 4b; 4c) of the valve block (2; 2a; 2b; 2c) and in the axial direction by the inner wall (14; 14a; 14b) of the receiving bore (4; 4a; 4b) of the valve block (2; 2a; 2b) and by the valve holder (30) or the valve housing (12a; 12b; 12c), or only by the valve housing (12c).

3. The valve assembly of claim 2, wherein the valve holder (30; 30a; 30b) is embodied in bushlike fashion and at least partly surrounds the valve housing (12; 12a; 12b), as viewed in the axial direction.

4. The valve assembly of claim 3, wherein the diameter of the receiving bore (4; 4a; 4b) is reduced in stages by the first radially inner shoulder (24; 24a; 24b) and a second radially inner shoulder (26; 26a; 26b), adjoining the first radially inner shoulder in the joining direction, and a third radially inner shoulder (28; 28a; 28b).

5. The valve assembly of claim 4, wherein the valve holder (30b) has an inner bore that is continuously smooth, and that the diameter of the receiving bore (4b) is reduced further by a fourth radially inner shoulder (72b) adjoining the third radially inner shoulder (28b) in the joining direction.

6. The valve assembly of claim 5, wherein a flange ring (70b), embodied on the outer circumference of the valve housing (12b), is fastened between an end face (58b) on the foot end of the valve holder (30b) and the third radially inner shoulder (28b) of the receiving bore (4b).

7. The valve assembly of claim 4, wherein a radially inner shoulder (38; 38a) is embodied on the head end of the valve holder (30; 30a), by which shoulder the valve housing (12; 12a) is braced against the third radially inner shoulder (28; 28a) of the receiving bore (4; 4a), and a lower portion (36; 36a) of the valve housing (12; 12a) protrudes from the valve holder (30; 30a).

8. The valve assembly of claim 7, wherein the radially outer circumferential face (42) of the valve housing (12) is embodied as cylindrically smooth in the region of the valve holder (30).

9. The valve assembly of claim 2, wherein the annular chamber (62) receiving the O-ring (32) is defined in the radial direction by the lower portion (36), protruding from the valve holder (30), of the valve housing (12) and by the part (64) of the inner wall (14) of the receiving bore (4) that adjoins the first radially inner shoulder (24) in the joining direction, the receiving bore having the same inside diameter as the valve holder (30), and which is defined in the axial direction by an end face (58) on the foot end of the valve holder (30) and by the second radially inner shoulder (26) of the receiving bore (4).

10. The valve assembly of claim 2, wherein the annular chamber (62a) receiving the O-ring (32a) is defined in the axial direction by an outer shoulder (66a), embodied on the lower portion (36a), protruding from the valve holder (30a), of the valve housing (12a), and by the third radially inner shoulder (28a) of the receiving bore (4a) and in the radial direction by the valve housing (12a), which at this point is reduced in diameter by the shoulder (66a), and by the part (66a) of the inner wall (14a) of the receiving bore (4a) that adjoins the second radially inner shoulder (26a) in the joining direction, the receiving bore at this point having essentially the same inside diameter as the valve holder (30*a*).

11. The valve assembly of claim 2, wherein the annular chamber (62*b*) receiving the O-ring (32*b*) is defined in the radial direction by a lower, reduced-diameter valve housing foot (18*b*) and the part (78*b*), adjoining the third radially inner shoulder (28*b*) in the joining direction, of the inner wall (14*b*) of the receiving bore (4*b*) and in the axial direction by a lower flange face (76*b*) and the fourth radially inner shoulder (72*b*) of the receiving bore (4*b*).

12. The valve assembly of claim 2, wherein the O-ring (32*c*) is received in a further annular groove (82*c*) on the outer circumference (80*c*) of the valve housing (12*c*), adjoining the one annular groove (52*c*) in the joining direction.

* * * * *